US010498682B2

(12) United States Patent
Themereau

(10) Patent No.: US 10,498,682 B2
(45) Date of Patent: Dec. 3, 2019

(54) METHOD FOR PROCESSING IMAP DATA FLOWS, ELECTRONIC MAIL SERVERS AND COMPUTER PROGRAMS IMPLEMENTING SAID METHODS

(71) Applicant: STREAMWIDE, Paris (FR)

(72) Inventor: Vincent Themereau, Paris (FR)

(73) Assignee: STREAMWIDE, Paris (FR)

(*) Notice: Subject to any disclaimer, the term of this patent is extended or adjusted under 35 U.S.C. 154(b) by 185 days.

(21) Appl. No.: 14/403,438

(22) PCT Filed: May 29, 2013

(86) PCT No.: PCT/FR2013/051195
§ 371 (c)(1),
(2) Date: Nov. 24, 2014

(87) PCT Pub. No.: WO2013/178944
PCT Pub. Date: Dec. 5, 2013

(65) Prior Publication Data
US 2015/0142900 A1 May 21, 2015

(30) Foreign Application Priority Data
May 31, 2012 (FR) ...................... 12 55031

(51) Int. Cl.
*G06F 15/16* (2006.01)
*H04L 12/58* (2006.01)
(52) U.S. Cl.
CPC ............ *H04L 51/22* (2013.01); *H04L 51/066* (2013.01); *H04L 51/18* (2013.01)
(58) Field of Classification Search
CPC ........ H04L 51/22; H04L 51/066; H04L 51/18
(Continued)

(56) References Cited

U.S. PATENT DOCUMENTS 6,021,432 A * 2/2000 Sizer, II .................. G06F 13/00
709/217
6,665,378 B1 * 12/2003 Spielman ................ G06F 9/542
370/353
(Continued)

FOREIGN PATENT DOCUMENTS

CN 1561076 A 1/2005
EP 1953646 8/2008
(Continued)

OTHER PUBLICATIONS

French Search Report and Written Opinion dated Mar. 12, 2013 for Application No. FR 1255031.
(Continued)

*Primary Examiner* — Krisna Lim
(74) *Attorney, Agent, or Firm* — Frost Brown Todd LLC

(57) ABSTRACT

Method for processing at least two IMAP data flows exchanged via an internet network between an electronic mail server and two remote clients respectively using a first and a second separate proprietary IMAP protocol, each IMAP data flow respectively corresponding to a respective remote client connection to an electronic mailbox, said method comprising the extraction of proprietary protocol data from an IMAP data flow, the execution of at least one task relating to the proprietary protocol data by a proprietary IMAP application module, and the generation of a return IMAP data flow, the proprietary IMAP application module being selected from two modules suitable for executing tasks relating respectively to the first and second proprietary IMAP protocols.

13 Claims, 3 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 7,093,029 B2* | 8/2006 | Brown | ................ | H04L 51/066 709/217 |
| 7,194,252 B1* | 3/2007 | Jordan, Jr. | ............ | H04L 51/066 455/411 |
| 7,392,289 B2* | 6/2008 | Curry | ................... | G06Q 10/107 709/203 |
| 8,126,976 B2* | 2/2012 | Klassen | ............... | H04L 51/063 709/206 |
| 2001/0042100 A1 | 11/2001 | Guedalia | ............. | G06Q 10/107 709/206 |
| 2002/0112008 A1* | 8/2002 | Christenson | ........... | H04L 51/30 709/206 |
| 2002/0198948 A1* | 12/2002 | Lin | ...................... | H04L 51/066 709/206 |
| 2003/0088704 A1* | 5/2003 | Mertama | ............. | G06Q 10/109 709/246 |
| 2003/0096600 A1* | 5/2003 | Lewis | ..................... | H04L 29/06 455/412.1 |
| 2005/0038915 A1* | 2/2005 | Clarke | .................... | H04L 67/04 709/250 |
| 2005/0181768 A1* | 8/2005 | Roy | ..................... | G06Q 10/107 455/413 |
| 2006/0277322 A1* | 12/2006 | Liu | ...................... | H04L 51/066 709/246 |
| 2007/0094414 A1* | 4/2007 | Das | ........................ | H04L 67/02 709/248 |
| 2007/0207785 A1* | 9/2007 | Chatterjee | ......... | H04M 3/53333 455/414.1 |
| 2008/0117925 A1* | 5/2008 | Curtis | ..................... | H04L 67/04 370/412 |
| 2008/0189275 A1* | 8/2008 | Matsumoto | ........... | H04L 51/066 |
| 2008/0215684 A1* | 9/2008 | Thorkelsson | .......... | H04L 12/66 709/206 |
| 2009/0138562 A1* | 5/2009 | Schmulen | ............ | G06Q 10/107 709/206 |
| 2010/0306329 A1* | 12/2010 | Kinoshita | ............. | H04L 51/066 709/206 |
| 2011/0212710 A1* | 9/2011 | Roy | ..................... | G06Q 10/107 455/414.1 |
| 2012/0136953 A1* | 5/2012 | Lamb | ..................... | G06Q 10/10 709/206 |
| 2012/0198017 A1* | 8/2012 | LeVasseur | .............. | H04L 51/24 709/206 |
| 2012/0278620 A1* | 11/2012 | Singh | .................... | H04L 51/063 713/168 |
| 2013/0266129 A1* | 10/2013 | Pattan | ..................... | H04L 51/24 379/88.11 |
| 2013/0282850 A1* | 10/2013 | Lu | ....................... | H04M 3/4872 709/206 |
| 2014/0192967 A1* | 7/2014 | Christophe | ........... | H04M 3/533 379/88.11 |
| 2014/0297722 A1* | 10/2014 | Ding | ................... | H04L 65/4023 709/203 |
| 2016/0065509 A1* | 3/2016 | Yang | ....................... | H04L 51/22 715/752 |

FOREIGN PATENT DOCUMENTS

| | | |
|---|---|---|
| EP | 2144409 B1 | 8/2010 |
| EP | 2 257 004 A1 | 12/2010 |
| EP | 2299634 | 3/2011 |
| JP | H11-175419 A | 7/1999 |
| JP | 2000-270013 A | 9/2000 |
| JP | 2010-278484 A | 12/2010 |
| WO | WO 01/77842 | 10/2001 |

OTHER PUBLICATIONS

Canadian Office Action dated Jan. 15, 2016 for Application No. CA 2,874,207, 4 pgs.
Chinese Office Action, The First Office Action, and First Search dated Jan. 3, 2017 for Application No. CN 201380040678.6, 12 pgs.
Chinese Office Action, The Second Office Action, dated Jul. 12, 2017 for Application No. CN 201380040678.6, 11 pgs.
European Office Action, Decision to Grant a European Patent, dated Dec. 22, 2016 for Application No. EP 13730293.1, 2 pgs.
International Research Report and Written Opinion dated Jul. 23, 2013 for Application No. PCT/FR2013/051195, 17 pgs.
Japanese Office Action, Notification of Reasons for Refusal dated Nov. 7, 2017 for Application No. JP 2015-514561, 4 pgs.
Japanese Office Action, Notification of Reasons for Refusal, and Search Reort by Registered Searching Organization dated Apr. 4, 2017 for Application No. JP 2015-514561, 12 pgs.

* cited by examiner

METHOD FOR PROCESSING IMAP DATA FLOWS, ELECTRONIC MAIL SERVERS AND COMPUTER PROGRAMS IMPLEMENTING SAID METHODS

The present invention relates to electronic mail servers and to methods for processing IMAP data flows exchanged via an internet network between an electronic mail server and remote clients respectively using separate proprietary IMAP protocols, for example mobile terminals connected to an internet network.

More particularly, the invention relates to a method for processing at least two IMAP data flows, the IMAP data flows being exchanged via an internet network between an electronic mail server and at least two remote clients respectively using a first and a second separate proprietary IMAP protocol, each IMAP data flow respectively corresponding to a connection of a respective remote client to an electronic mailbox.

With the development and diversification of electronic terminals, a user of today may need to access his mailbox of electronic mails (or "emails") from a computer, a mobile terminal, a mobile phone, a tablet with touchscreen, or any other device capable of communicating with an Internet network. These remote clients have varied capabilities for computation, storage and display and employ multiple communication protocols. They also have internet network connections which may have limited or fluctuating availability and bandwidth. Communication of remote clients with the electronic mail server, delivery of electronic mails to the user as well as their successful receipt and presentation on the display unit of the remote client are frequently a source of uncertainty.

Document EP 2-144-409-B1 describes an example of a method for providing an electronic mail message in several parts to a mobile terminal in order to adapt to the low bandwidth and reduced storage capacity of such client terminals.

The present invention provides further improvements.

For this purpose, according to the invention, a method of the type in question is characterized in that it comprises a translation step including: a sub-step carried out by an analysis module and consisting of the extraction of proprietary protocol data from an IMAP data flow, a sub-step consisting of the execution of at least one task relating to the extracted proprietary protocol data by a proprietary IMAP application module in order to obtain proprietary protocol response data, and a sub-step carried out by the analysis module consisting of the generation of a return IMAP data flow from the proprietary protocol response data, said proprietary IMAP application module being selected from among a first and a second proprietary IMAP application module, the first proprietary IMAP application module being adapted to execute tasks relating to the first proprietary IMAP protocol, the second proprietary IMAP application module being adapted to execute tasks relating to the second proprietary IMAP protocol.

In preferred embodiments of the invention, one or more of the following arrangements may possibly be used:
- the proprietary IMAP application module is selected from among the first and second proprietary IMAP application modules on the basis of technical specifications information associated with the remote client;
- the analysis module exchanges data with at least one storage server via a network, the method further comprising an authentication step performed before the translation step and comprising: a sub-step of identification of the remote client by the electronic mail server, and a sub-step of retrieval on the electronic mail server, from a storage server, technical specifications information associated with the remote client;
- the proprietary IMAP application module exchanges data with at least one storage server via a network, wherein the sub-step consisting of the extraction of proprietary protocol data from an IMAP data flow comprises the extraction of a request to deliver an electronic mail identified by an electronic mail identifier, wherein the sub-step consisting of the execution of at least one task relating to the extracted proprietary protocol data includes the operations of: obtaining data to be encapsulated and message attribute data from at least one storage server, said data being associated with the electronic mail identifier, and generating the electronic mail from the data to be encapsulated and the message attribute data, and wherein the sub-step consisting of the generation of a return IMAP data flow comprises the transmission of said electronic mail to the remote client;
- the operation of obtaining data to be encapsulated and message attribute data from at least one storage server comprises the updating of said data on the storage server;
- the operation of generating the electronic mail and/or the operation of obtaining data to be encapsulated and message attribute data from at least one storage server is carried out based on the technical specifications information;
- the data to be encapsulated contain data selected from a list comprising: a voicemail message, a visual voicemail message, an image, a video, a sound recording, a fax, a scanned document, an event notification;
- the storage server is accessible, by the remote client and via the internet network, solely through the electronic mail server.

The invention also relates to an electronic mail server for processing at least two IMAP data flows, the IMAP data flows being exchanged via an internet network with at least two remote clients respectively using a first and a second separate proprietary IMAP protocol, each IMAP data flow respectively corresponding to a connection of a respective remote client to an electronic mailbox, the electronic mail server comprising: an analysis module for carrying out a sub-step consisting of the extraction of proprietary protocol data from an IMAP data flow, and a sub-step consisting of the generation of a return IMAP data flow from the proprietary protocol response data, and at least a first and a second proprietary IMAP application module, the first proprietary IMAP application module being adapted to execute tasks relating to the first proprietary IMAP protocol, the second proprietary IMAP application module being adapted to execute tasks relating to the second proprietary IMAP protocol, said proprietary IMAP application modules being adapted to carry out a sub-step consisting of the execution of at least one task relating to the extracted proprietary protocol data in order to obtain proprietary protocol response data.

Lastly, the invention relates to a computer program product comprising instructions suitable for implementing, when this program is executed by a processor of an electronic mail server, the steps of a method as described above.

In general, certain of these embodiments offer one or more of the following advantages. The IMAP communication can thus be adapted to the remote client. The technical specifications information for the remote client can be indicated separately and allow adapting the electronic mails transferred to the client terminal. The performance of the electronic mail server is improved, one reason being that it does not need to store the electronic mails in its memory. It is possible by this method to send the client a variety of data in electronic mail form, such as voice or video messages, faxes, and event notifications such as missed calls. These data can be stored on the storage server in a different format than the electronic mail format, which eliminates having to adapt the storage server to its use. These data can be converted to an appropriate format for the remote client when the electronic mail is generated.

Other features and advantages of the invention will be apparent from the following description of one of its embodiments, given by way of non-limiting example, with reference to the accompanying drawings.

In the drawings.

In the various figures, the same references denote identical or similar elements.

Figure 1:
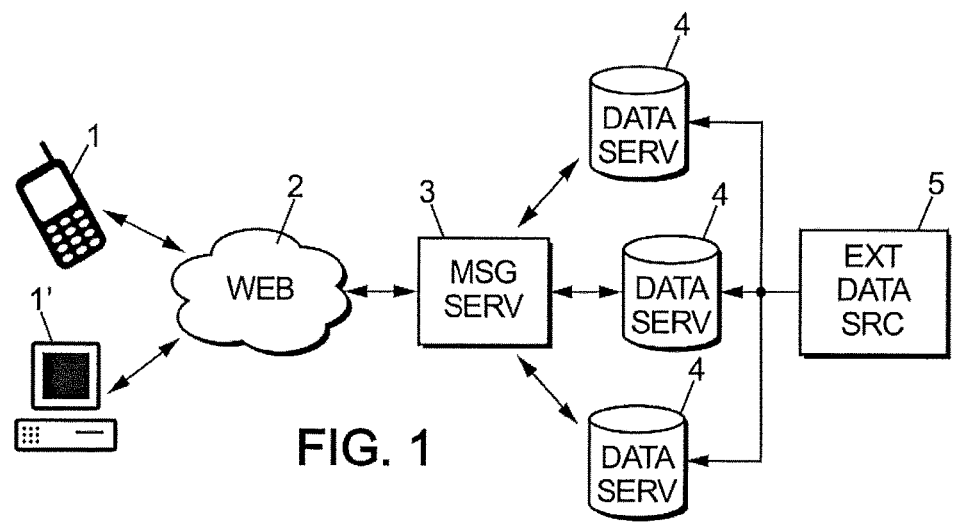
FIG. 1 is a block diagram illustrating a system that can employ a method for processing at least two IMAP data flows according to the invention.

Referring firstly to FIG. 1, a system may comprise one or more remote clients 1, 1' connected via an internet network 2 to an electronic mail server 3 which is connected to at least one storage server 4.

In the following description, the terms "email", "message", "electronic mail", "electronic message", and terms derived from these will be used interchangeably.

Two remote clients 1 and 1' are represented in FIG. 1 for purely illustrative purposes, but any number of remote clients may be employed. The remote clients may be of different types. For example, a first remote client 1 illustrated in FIG. 1 consists of a mobile terminal such as a smartphone, while a second remote client 1' illustrated in FIG. 1 can consist of a desktop computer.

The remote client(s) 1 are connected to the electronic mail server 3 via the internet network 2 and can exchange information using known Internet communication protocols such as TCP/IP (acronyms for "Transmission Control Protocol" and "Internet Protocol").

The remote clients 1 may be connected to the internet network 2 directly or through a router or firewall, for example in the case where said remote client 1 consists of a desktop computer.

Alternatively, the remote clients may access the internet network 2 via a wireless wide area network or WWAN, also known as a mobile cellular network or terrestrial mobile network, or via a wireless local area network or WLAN.

This wireless network may, for example, comprise a plurality of mobile telephony cell towers, also referred to as base stations, each allowing communication with mobile terminals or remote clients located within a defined geographical area. The cell towers may be connected via routing equipment to a gateway which allows exchanging data with the internet network. The network formed by the equipment may be one of the following types: Mobitex Radio Network, DataTAC, GSM ("Global System for Mobile Communication"), GPRS ("General Packet Radio System", TDMA ("Time Division Multiple Access"), CDMA ("Code Division Multiple Access"), CDPD ("Cellular Digital Packet Data"), iDEN ("integrated Digital Enhanced Network"), EvDO ("Evolution-Data Optimized") CDMA2000, EDGE ("Enhanced Data rates for GSM Evolution"), UMTS ("Universal Mobile Telecommunication Systems"), HSDPA ("High-Speed Downlink Packet Access"), WiMax ("Worldwide Interoperability for Microwave Access"), or another type.

Alternatively, the remote client 1 may comprise a desktop computer, a laptop computer, a touchscreen tablet, or any other electronic device without the ability to connect to said wireless network. The remote client 1 can then be connected to the wireless network via an external connection device, for example connected to the remote client 1 via one or a combination of: an Ethernet connection, a USB interface (acronym for "Universal Serial Bus"), a FireWire interface (also known as the IEEE 1394 interface), or some other interface for exchanging data serially, via the respective ports or the interfaces of the remote client.

The internet network 2 may comprise a local private network, a metropolitan area network or MAN, a wide area network or WAN, the Internet, or combinations of these, combinations which may for example include virtual private networks.

The remote clients 1 may make use of proprietary IMAP protocols.

In particular, the remote clients 1 may make use of separate proprietary IMAP protocols.

For example, a remote client 1 may make use of a proprietary IMAP protocol such as the protocol "Apple Visual Voicemail Protocol Specification" v1.1 of Mar. 5, 2008, or the protocol "OMTP Visual Voice Mail Interface Specification" v1.3 of Jun. 11, 2010, or other protocols.

The separate proprietary IMAP protocols are separate because they have separate commands, parameters, and/or identifiers.

Figure 2A:
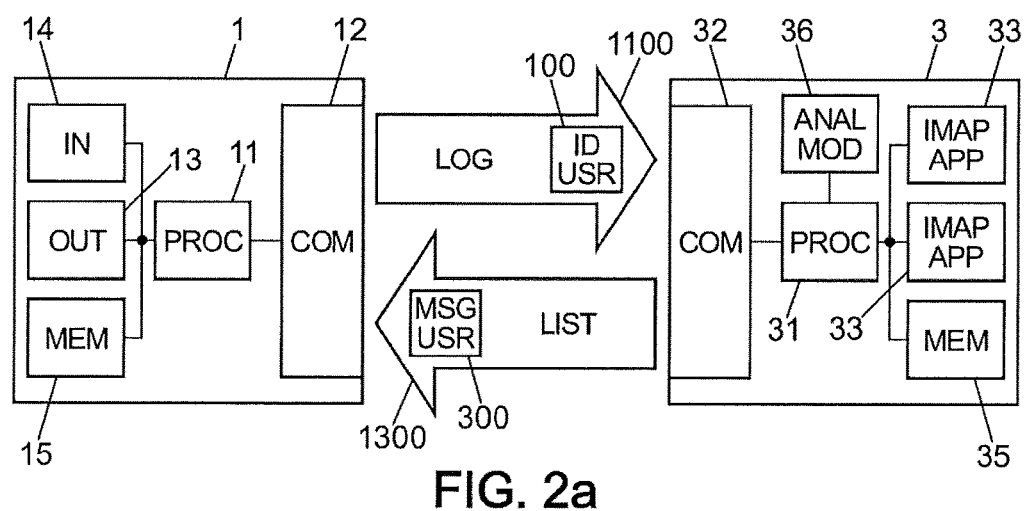
FIGS. 2a and 2b are block diagrams illustrating an embodiment of a method for processing at least two IMAP data flows according to the invention, detailing the interactions between a remote client and an electronic mail server.
Figure 2B:
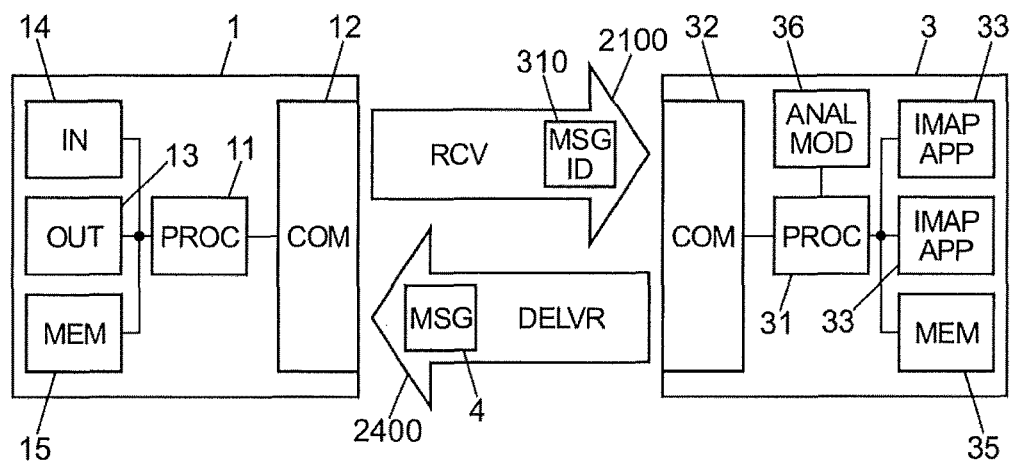

Referring now to FIGS. 2a and 2b as well, a remote client 1 may comprise a processor 11 which controls the general operation of the remote client 1.

In practice, the processor 11 may consist of one or more programmed microprocessors.

The processor 11 can interact with a communication module 12 which carries out the communication sub-steps.

The processor 11 can also interact with additional peripheral modules which may optionally include but are not limited to: output devices 13, input devices 14, and a storage module 15. The additional peripheral modules are not limited to the above list.

The output devices 13 may include a display module, for example a liquid crystal display (LCD) or a monitor, for example a cathode-based or digital display.

They may also include a module for audio output, for example a speaker or headphones.

The input devices 14 may include, for example, a keyboard, a mouse, a navigation device such as one or more clickable scroll wheels, a trackball, a touchpad, a touchscreen, a microphone, or any other device allowing a user to send commands or information to the remote client.

The keyboard may be a full alphanumeric keyboard, or may be a reduced or simplified alphanumeric keyboard such as a telephone keypad for example.

In some embodiments, an input device 14 and a display module 13 can be implemented using a touchscreen comprising a display device with a touch-sensitive input surface.

The storage module 15 of the remote client 1 may comprise, for example, one or more random access memories (RAM), read-only memory (ROM), a hard drive (HDD), or any other medium for storing digital data.

The storage module 15 can be used to store local data on the remote client 1 such as electronic mails or electronic mail attachments.

In some embodiments, the storage module 15 consists of storage memory having a memory location reserved for storing electronic mails or electronic mail attachments.

The storage module 15 is represented as a single block in FIG. 2a for illustrative purposes, but it is evident that the storage module 15 can comprise a plurality of memory media including different types of memory as detailed above, for example ROM, RAM, and a hard drive.

The storage module 15 of the remote client 1 can also store other data, such as services data comprising information required by the remote client 1 for establishing and controlling the communication with the internet network 2 and the electronic mail server 3, for example network services data.

The storage module 15 of the remote client 1 can also store user data for software applications such as electronic mails, address and contact information, a calendar, text documents, image files, audio or video files, or any other user information conventionally stored on the remote client 1.

The data stored in the storage module 15 of the remote client 1 may be organized, at least partially, into a number of databases which for example each contain data of the same type or data associated with the same software application of the remote client 1.

The processor 11 conventionally executes instructions of a program, also referred to as software and stored in the storage module 15, and can for example run software modules stored in the storage module 15.

These software modules may include a core program or operating system, and software applications. The software modules or portions thereof referred to as processes may be temporarily loaded into volatile memory, for example random access memory (RAM) of the storage module 15.

The random access memory is also used to store variable runtime data or other types of data or information temporarily used during execution of an application or software module.

The software applications can include a variety of applications, for example communication applications such as an electronic mail application, a voicemail application, a telephony communication application, a mapping application, a calendar application, a contact management application, and a media player application.

One will note that the remote client 1 may comprise additional modules that are not represented in FIG. 2a but are well known to those skilled in the art, for example a power supply that may include an interface for connecting to the power grid or one or more rechargeable batteries.

The power supply provides electricity in the conventional manner to at least a portion of the electrical circuitry of the remote client 1.

Figure 3:
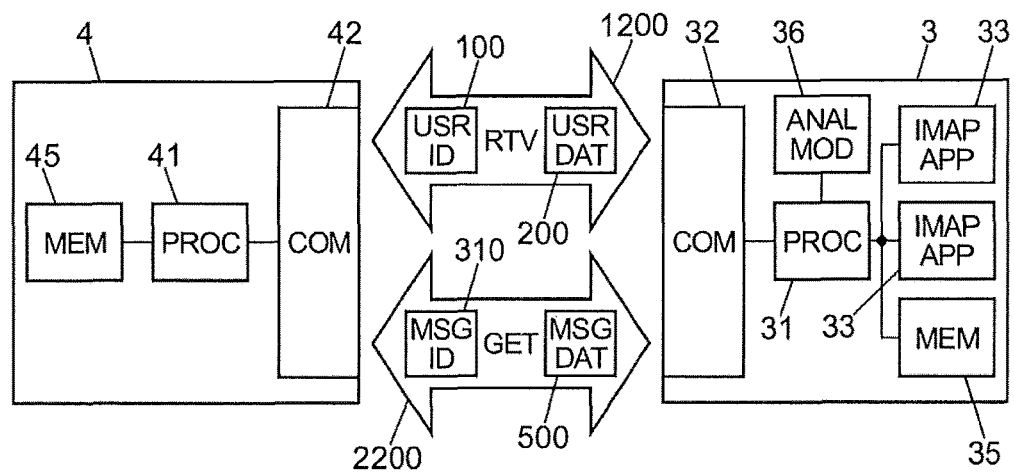
FIG. 3 is a block diagram illustrating an embodiment of a method for processing at least two IMAP data flows according to the invention, detailing the interactions between an electronic mail server and a storage server.

Referring in particular to FIGS. 2a, 2b and 3, an electronic mail server 3 will now be described in more detail.

The electronic mail server 3 can be implemented using any known server or computer and can, for example, be created using one or more computers and/or servers running one or more software applications performing the functions described below.

The electronic mail server 3 is configured to implement a certain number of modules optionally including but not limited to: a control module 31, communication modules 32, an analysis module 36, proprietary IMAP application and electronic mail generation modules 33, and storage modules 35.

In one embodiment, the electronic mail server 3 may for example comprise one or more microprocessors that execute the instructions of one or more programs, also known as software applications, in order to implement said modules.

These programs or software applications may, for example, be stored in non-volatile or read-only memory of the mail server 3.

The control module 31 can control the execution of the components and modules of the electronic mail server 3, launch them, shut them down, and restart them as necessary.

The communication modules 32 connect to the remote clients 1 and to the storage servers 4.

The communication modules 32 may be adapted to communicate with the remote clients 1 and storage servers 4 via a private local network, a metropolitan area network (MAN), a wide area network (WAN), the Internet, or via combinations thereof, combinations which may for example include virtual private networks.

The control module 31, the communication modules 32, the analysis module 36, the proprietary IMAP application and electronic mail generation modules 33, and the storage modules 35, may for example each be implemented by means of standalone software applications, or combined within one or more software applications, or as processes of another software application.

In some embodiments, the functions performed by each of the modules identified above may be carried out in a plurality of independent modules rather than in a single integrated module, and one or more of these modules may be implemented as parts of other software applications.

A remote client 1 can, for example, control its electronic mailbox and exchange electronic mails with the electronic mail server 3 using a protocol for viewing, retrieving, and/or sending electronic mail such as the IMAP protocol (acronym for "Internet Message Access Protocol") or a derivative protocol.

The remote clients 1 exchange an IMAP data flow with the electronic mail server 3 via the internet network.

This IMAP data flow comprises a set of instructions and information exchanged between a remote client 1, 1' and the electronic mail server 3 according to an IMAP protocol, for example a proprietary IMAP protocol as mentioned above for the remote clients 1.

A storage server 4 will now be described in more detail, with particular reference to FIG. 3.

Similarly to the electronic mail server 3, the storage server 4 can be implemented using any known server or computer and can, for example, be implemented using one or more computers and/or servers and executing one or more software applications carrying out the functions described below.

The storage server 4 is configured to implement a certain number of modules, optionally including but not limited to: a control module 41, communication modules 42, and storage modules 45.

In one embodiment, the storage server 4 may for example comprise one or more microprocessors that execute the instructions of one or more programs, also known as software applications, in order to implement said modules.

These programs or software applications may, for example, be stored in non-volatile or read-only memory of the storage server 4.

The control module 41 can control the execution of the components and modules of the storage server 4, launch them, shut them down, and restart them as necessary.

The communication modules 42 can connect to and exchange data with the electronic mail server 3 and external data sources 5, for example via a wireless wide area network (WWAN) also known as a mobile cellular network or mobile terrestrial network, a wireless local area network (WLAN), a private local network, a metropolitan area network (MAN), a wide area network (WAN), the Internet, or combinations thereof, combinations which may further include virtual private networks.

The external data sources 5 may include a variety of source terminals of different types depending on the data stored in the storage server 4.

Purely as an illustration, a storage server 4 of a voicemail system, suitable for storing voice messages, can have, as external data sources 5, telephones connecting to said storage server via a telephone network.

The electronic mail server 3 connects to the communication modules 42 of a storage server 4 by means of a web service, for example by using a protocol from among: OSA, SOAP, REST, XML-RPC, or a combination of these protocols.

Any suitable data exchange protocol can be used for the communication between the electronic mail server 3 and the storage servers 4.

The control module 41, the communication modules 42, and the storage modules 45 may for example each be implemented by means of standalone software applications, or combined within one or more software applications, or implemented as processes of another software application.

In some embodiments, the functions performed by each of the modules identified above may be carried out in a plurality of independent modules rather than in a single integrated module, and one or more of these modules may be implemented as parts of other software applications.

Advantageously, the storage server or servers 4 can be accessed by the remote client 1 via the internet network 2 solely through the electronic mail server 3.

A user of a remote client 1 therefore cannot directly access the storage servers 4 via the Internet network 2.

In this manner, the storage servers 4 can be protected from security breaches.

A method for processing IMAP flows will now be described in more detail, with reference to FIG. 4 as well.

This method comprises a translation step 2000 which may be preceded by a connection step 1000.

Figure 4:
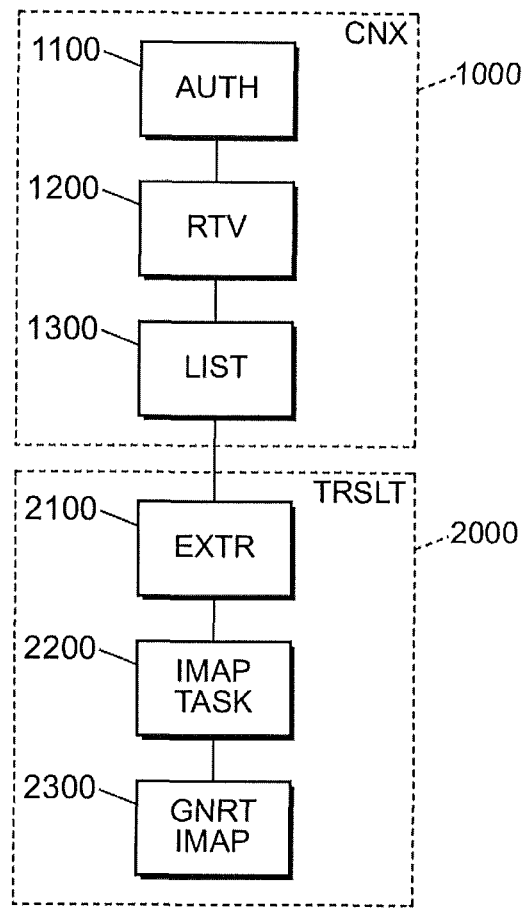
FIG. 4 is a flowchart illustrating an embodiment of a method for processing at least two IMAP data flows according to the invention.

Referring in particular to FIGS. 2*a* and 4, the connection step 1000 may include a first authentication sub-step 1100 during which the remote client 1 identifies itself to the electronic mail server 3.

The authentication sub-step 1100 may, for example, include the transmission to the electronic mail server 3 of user identifiers 100 which may contain, for example, a user name 110 and a password 120.

In some embodiments, for example when the network 2 is a non-secured network such as the Internet, the user identifiers 100 may advantageously be communicated in encrypted form.

Communications can be protected by using a secure transfer protocol, such as the Transport Layer Security (TLS) protocol.

The remote client 1 can then request opening a secure session, such as a TLS session, prior to sending the user identifiers 100.

The communications can then be encrypted using a symmetric encryption key, for example by means of algorithms such as AES (the acronym for "Advanced Encryption Standard"), or Triple DES ("Triple Data Encryption Standard").

Private encryption key can be generated in a protected environment and used for data encryption and decryption.

In one embodiment of a method according to the invention that includes such a secure TLS session, the remote client 1 can, before requesting that a TLS session be opened, ask the electronic mail server 3 to list its capabilities in order to verify that the electronic mail server 3 has the ability to communicate via a secure TLS session.

The authentication sub-step 1100 can be implemented using a protocol for viewing, retrieving, and/or sending electronic mail such as the IMAP protocol (acronym for "Internet Message Access Protocol").

Once the electronic mail server 3 has obtained the user identifiers 100, it can compare them with reference user identifiers 130 stored in memory. The reference identifiers 130 could also be stored on a remote server, for example a storage server 4.

If the user identifiers 100 are identical to the reference identifiers 130, the remote client 1 can be identified.

During a second sub-step 1200, the electronic mail server 3 can obtain technical specifications information 200 from a storage server 4. This technical specifications information 200 is advantageously associated with the user identifiers 100 of the remote client 1, for example by means of a database 299 of a storage server 4.

The technical specifications information 200 may, for example, include hardware information 210 concerning the electronic hardware of the remote client 1 and software information 220 concerning the software applications installed on said remote client 1 and/or the operating system of said remote client 1.

It may also include information 230 concerning the user of the remote client 1, for example the language in which the user wishes to read messages.

Finally, it may include information 240 configured by the user of the remote client and indicating for example how the user wishes to access electronic mail through the remote client 1, for example with or without the display of images.

During an optional third sub-step 1300, the remote client 1 can obtain a list of messages 300 contained in the electronic mailbox or in a directory of its electronic mailbox, for example the directory corresponding to the Inbox.

The remote client 1 can send a request to the electronic mail server 3, for example to obtain a list of messages, according to a protocol for viewing, retrieving, and/or sending electronic mails such as the IMAP protocol (acronym for "Internet Message Access Protocol").

This list of messages 300 may contain one or more electronic mail identifiers 310 each associated with an electronic mail 400 in the electronic mailbox.

The electronic mail server 3 can use the technical specifications information 200 when generating the list of messages 300.

As an illustration, the electronic mail server 3 can then select for inclusion, in the list of messages 300, only those messages likely to be read by the remote client 1.

The connection step 1000 can be carried out at least in part by the analysis module 36.

After the connection step 1000, the translation step 2000 consists of, generally and without limitation, translating and executing the instructions contained in the IMAP data flow. This step can also include other sub-steps and will now be detailed further.

The translation step 2000 includes a first sub-step 2100 carried out by the analysis module 36, and consisting of extracting proprietary logic data from an IMAP data flow.

Then, in a second sub-step 2200, tasks relating to the extracted proprietary protocol data are executed by a proprietary IMAP application module.

The proprietary logic data are associated with each proprietary IMAP protocol.

They are defined so that they translate the instructions of each proprietary IMAP protocol into a form of instructions executable by the proprietary IMAP application modules.

The proprietary IMAP application module is selected from among a plurality of proprietary IMAP application modules on the basis of the technical specifications information 200 obtained in the connection step 1000.

For example, a first proprietary IMAP application module may be adapted to execute instructions of a first proprietary IMAP protocol, for example the protocol "Apple Visual Voicemail Protocol Specification" v1.1 of Mar. 5, 2008.

A second proprietary IMAP application module may be adapted to execute instructions of a second proprietary IMAP protocol, for example the protocol "OMTP Visual Voice Mail Interface Specification" v1.3 of Jun. 11, 2010.

In sub-step 2200, the proprietary IMAP application module can thus generate proprietary protocol response data, for example as will be further described in relation to the generation of an email on request.

Finally, the translation step 2000 includes a last sub-step 2300, carried out at least in part by the analysis module 36, which consists of generating a return IMAP data flow from the proprietary protocol response data.

The above method may, for example, be used for delivering on request an email which consists, in general but without limitation, of the electronic mail server 3 delivering to a remote client 1 an email 400 requested by said client.

To this end, the sub-step consisting of extracting proprietary protocol data from an IMAP data flow may include extraction of a request to deliver an electronic mail, said request containing an electronic mail identifier 310 issued by a remote client 1.

This electronic mail identifier 310 may, for example, contain a set of alphanumeric characters or a code identifying the electronic mail 400 requested by the remote client 1.

This electronic mail identifier 310 can be changed over time by the electronic mail server 3, for example when the electronic mail 400 is moved between directories in the electronic mailbox, but identifies at a given time the electronic mail 400 requested by the remote client.

Figure 5:
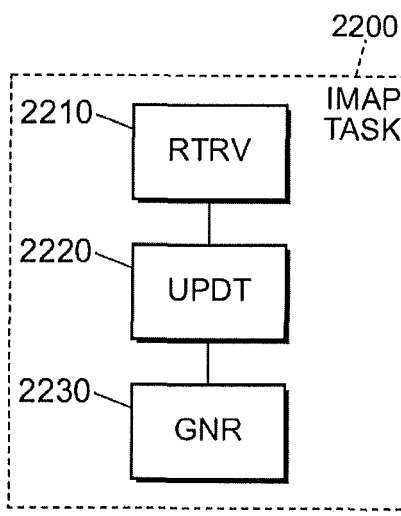
FIG. 5 is a flowchart illustrating an embodiment of a sub-step of a method for delivering electronic mail on request according to the invention.

Referring also to FIG. 5, the sub-step 2200 consisting of executing tasks related to the extracted proprietary protocol data may include multiple operations carried out by a proprietary IMAP application module of the electronic mail server 3.

During a first retrieval operation 2210, the electronic mail server 3 retrieves electronic mail generation data 500 from one or more storage servers 4.

The electronic mail generation data 500 may advantageously be associated with the electronic mail identifier 310, for example by means of a database 599 of the storage server 4.

The electronic mail generation data 500 may also be associated with the remote client identifier 310, for example by means of a database 598 of a storage server 4.

The electronic mail generation data 500 may contain data to be encapsulated 510, for example a voice message or visual message, an image or a video, a sound recording, a fax or scanned document, an event notification, for example notification of a missed call, and/or any other data intended to be encapsulated in the electronic mail 400 or linked to the electronic mail 400, for example in the form of an attachment 410 by using the MIME exchange protocol (acronym for "Multipurpose Internet Mail Extensions") or S/MIME protocol (for "Secure/Multipurpose Internet Mail Extensions").

The electronic mail generation data 500 may also include message attributes 520 defining generation parameters for the electronic mail 400.

The message attributes 520 may define the language in which the message is to be generated, the parameters related to the subject line, message body, and message sender.

The message attributes 520 may define parameters for generating the electronic mail headers 420.

Sub-step 2200 which executes tasks relating to the proprietary protocol data may also include an operation 2220 of updating the electronic mail generation data 500 on the storage server.

This update may consist of updating the status of the electronic mail generation data 500, for example in a database, moving the electronic mail generation data 500 to another directory of a storage module 45 of the storage server 4, or modifying the electronic mail generation data 500 on the storage server 4.

For purely illustrative purposes, in an embodiment where the storage server 4 is part of a voicemail system and is suitable for storing voice messages, the electronic mail generation data 500 may include voice messages and the updating of said electronic mail generation data 500 may include the archiving of said voice messages.

A third operation 2230, the generation operation, can then include the generation by the proprietary IMAP application module of the electronic mail 400 associated with the electronic mail identifier 310.

The generation operation 2230 is advantageously carried out based on the technical specifications information 200 and/or the electronic mail generation data 500.

The generation operation 2230 includes the generation of headers 420 for the electronic mail 400, for example headers specifying the subject, recipient, sender, date, return address, a secondary identifier for the message, the electronic mail priority, variables or identifiers for MIME or HTTP versions, type of content, content identifier, type of encoding, variables or version identifiers for the software application, and/or any other useful electronic mail field.

The generation operation 2230 may also include generating the body 430 of the electronic mail 400.

Generation of the body 430 of the electronic mail can include generating message text, images, video, animations, and/or sounds to be included in the body 430 of the electronic mail.

The body 430 of the electronic mail may, for example, be generated in a language specified by the technical specifications information 200 and/or the message attributes 520.

As a non-limiting illustration, the software information 220 relating to the software applications installed on said remote client 1 may indicate that the remote client 1 has a specific software application for reading messages having an attachment that includes a voice message.

The electronic mail 400 can then be generated to meet the requirements of this software application, for example by means of the appropriate headers 420 or message body 430.

In another embodiment, and again as a non-limiting illustration, the technical specifications information 200 may indicate that the remote client 1 accesses messages using a known electronic mail client such as IBM Lotus Notes, Apple Mail, Microsoft Outlook, or Mozilla Thunderbird for example.

The electronic mail 400 can then be generated so that it is readable and understandable by a human user, for example by means of the appropriate headers 420 and/or message body 430.

The generation operation 2230 may further comprise the generation or adaptation of one or more attachments 410 to the message.

To provide another example of a non-limiting illustration which allows a better understanding of the advantages of the invention, the technical specifications information 200 may indicate one or more attachment 410 formats that the remote client 1 is able to present to the user: for example, in the case of a voicemail, one or more audio data formats that the remote client 1 can send to an output peripheral 13, such as a speaker.

The generation operation 2230 can then include the adaptation by transcoding of the data to be encapsulated 510 so as to generate an attachment 410 in a format readable by the remote client 1.

Finally, the generation operation 2230 may include the concatenation of headers 420, message body 430, and attachments 410 generated, to form the electronic mail 400.

Lastly, the sub-step 2300 consisting of generating a return IMAP data flow can include the transmission of the generated electronic mail 400 from the electronic mail server 3 to the remote client 1.

This transmission may include generating a return IMAP data flow containing the electronic mail generated in the previous sub-step 2200, and transmitting said return IMAP data flow to the remote client 1.

This transmission can be done via the internet network 2 and for example according to a protocol for viewing, retrieving, and/or sending electronic mails such as the IMAP protocol (acronym for "Internet Message Access Protocol").

In general, communications between the remote client 1 and the electronic mail server 3 can be carried out according to a protocol for viewing, retrieving, and/or sending electronic mails such as the IMAP protocol (acronym for "Internet Message Access Protocol").

The embodiments of the invention described above are described solely as examples.

Persons skilled in the art can make modifications and combinations of specific embodiments without departing from the scope of the invention.

In particular, the characteristics of one or more of the embodiments described above can be selected and combined to create variant embodiments comprising feature subsets that are not explicitly described above.

In addition, the characteristics of one or more of the embodiments described above can be selected and combined to create variant embodiments comprising combinations of features that are not explicitly described above.

The features appropriate for such combinations and sub-combinations will be evident to persons skilled in the art, upon reviewing the invention as a whole.

The object of the invention is also to be understood as covering all appropriate changes in technology, in particular changes to the computer protocols mentioned above.

The invention claimed is:

1. A method for processing at least two IMAP data flows, the IMAP data flows being exchanged via an internet network between an electronic mail server and at least two remote clients respectively using a first and a second separate proprietary IMAP protocol, each IMAP data flow respectively corresponding to a connection of a respective remote client to an electronic mailbox, the method being characterized in that it comprises a translation step performed by the electronic mail server during processing of each of the at least two IMAP data flows and upon reception, from the respective remote client whose connection to the electronic mailbox corresponds to the IMAP data flow being processed, of a request to deliver an electronic mail identified by an electronic mail identifier to said remote client, said translation step including:
a first sub-step carried out by an analysis module of said electronic mail server, consisting of the extraction, from the IMAP data flow being processed, of said request to deliver an electronic mail identified by an electronic mail identifier to said remote client and of proprietary protocol data for the proprietary IMAP protocol used for the IMAP data flow being processed,
a second sub-step consisting of the execution of at least one task by a proprietary IMAP application module that corresponds to the proprietary IMAP protocol used for the IMAP data flow being processed, said at least one task including the operations of:
obtaining data to be encapsulated and message attribute data from at least one storage server, said data to be encapsulated and message attribute data being associated with the electronic mail identifier, and
generating the electronic mail in a format consistent with the proprietary IMAP protocol for the IMAP data flow being processed from the data to be encapsulated and the message attribute data, and
a third sub-step carried out by the analysis module, comprising transmission of said electronic mail generated by the proprietary IMAP application module to the remote client.

2. The method according to claim 1, wherein the proprietary IMAP application module is selected from among a first proprietary IMAP application module and a second proprietary IMAP application module on the basis of technical specifications information associated with the respective remote client whose connection to the electronic mailbox corresponds to the IMAP data flow being processed.

3. The method according to claim 1, wherein the analysis module exchanges data with at least one storage server via a network, the method further comprising an authentication step performed before the translation step and comprising:
a sub-step of identification of the remote client by the electronic mail server, and
a sub-step of retrieval on the electronic mail server, from a storage server, technical specifications information associated with the remote client.

4. A non-transitory computer-readable medium comprising instructions suitable for implementing, when this program is executed by a processor of an electronic mail server, the steps of a method according to claim 1.

5. The method according to claim 1, wherein the operation of obtaining data to be encapsulated and message attribute data from at least one storage server comprises the updating of said data on the storage server.

6. The method according to claim 3, wherein the operation of generating the electronic mail and/or the operation of obtaining data to be encapsulated and message attribute data from at least one storage server, is carried out based on the technical specifications information.

7. The method according to claim 1, wherein the data to be encapsulated:
 contain data selected from a list comprising: a voicemail message, a visual voicemail message, an image, a video, a sound recording, a fax, a scanned document, an event notification; and
 is stored on the storage server in a format different from the format for the electronic mail.

8. The method according to claim 3, wherein the storage server is accessible, by the remote client and via the internet network, solely through the electronic mail server.

9. The method of claim 1, wherein the first and second separate proprietary IMAP protocols are separate because they have separate commands, parameters and/or identifiers.

10. The method of claim 1, wherein the first proprietary IMAP protocol has one or more commands that differ from the second proprietary IMAP protocol.

11. The method of claim 1, wherein the first proprietary IMAP protocol has one or more parameters that differ from the second proprietary IMAP protocol.

12. The method of claim 1, wherein the first proprietary IMAP protocol has one or more identifiers that differ from the second proprietary IMAP protocol.

13. An electronic email server for processing at least two IMAP data flows, the IMAP data flows being exchanged via an internet network with at least two remote clients respectively using a first and a second separate proprietary IMAP protocol, each IMAP data flow respectively corresponding to a connection of a respective remote client to an electronic mailbox, the electronic mail server configured to perform a translation step during processing of each of the at least two IMAP data flows, wherein the electronic mail server is configured to perform the translation step using modules comprising:
 an analysis module of said electronic mail server for carrying out a sub-step consisting of the extraction, from the IMAP data flow being processed of a request, received from said client whose connection to the electronic mailbox corresponds to the IMAP data flow being processed, to deliver an electronic mail identified by an electronic mail identifier to said remote client, and of proprietary protocol data for the proprietary IMAP protocol used for the IMAP data flow being processed, and a sub-step comprising the transmission of said electronic mail to the remote client, and
 at least a first and a second proprietary IMAP application module, the first proprietary IMAP application module being adapted to execute tasks relating to the first proprietary IMAP protocol, the second proprietary IMAP application module being adapted to execute tasks relating to the second proprietary IMAP protocol, said proprietary IMAP application module that corresponds to the proprietary IMAP protocol used for the IMAP data flow being processed being adapted to carry out a sub-step including the operations of:
 obtaining data to be encapsulated and message attribute data from at least one storage server, said data to be encapsulated and message attribute data being associated with the electronic mail identifier, and
 generating the electronic mail in a format consistent with the proprietary IMAP protocol for the IMAP data flow being processed from the data to be encapsulated and the message attribute data.

\* \* \* \* \*